US010774696B2

(12) United States Patent
Hutchins

(10) Patent No.: US 10,774,696 B2
(45) Date of Patent: Sep. 15, 2020

(54) HIGHLY EFFICIENT LINEAR MOTOR

(71) Applicant: SENTIMETAL JOURNEY, INC., Reno, NV (US)

(72) Inventor: Richard H. Hutchins, South San Francisco, CA (US)

(73) Assignee: SentiMetal Journey, LLC, South San Francisco, CA (US)

(*) Notice: Subject to any disclaimer, the term of this patent is extended or adjusted under 35 U.S.C. 154(b) by 0 days.

(21) Appl. No.: 15/947,131

(22) Filed: Apr. 6, 2018

(65) Prior Publication Data
US 2019/0264587 A1 Aug. 29, 2019

Related U.S. Application Data

(60) Provisional application No. 62/634,592, filed on Feb. 23, 2018.

(51) Int. Cl.
F01L 1/34 (2006.01)
F01L 9/04 (2006.01)
(Continued)

(52) U.S. Cl.
CPC .......... F01L 9/04 (2013.01); F01L 13/0015 (2013.01); F16K 31/046 (2013.01); H02K 33/12 (2013.01);
(Continued)

(58) Field of Classification Search
CPC . F01L 9/04; F01L 13/0015; F01L 2009/0405; F01L 2013/103; F16K 31/046; H02K 33/12; H02K 41/031
See application file for complete search history.

(56) References Cited

U.S. PATENT DOCUMENTS 2,411,734 A 11/1946 Kerwin
4,009,695 A 3/1977 Ule
(Continued)

FOREIGN PATENT DOCUMENTS

JP 2000-199411 2/2000
JP 2001-008432 1/2001
(Continued)

OTHER PUBLICATIONS

Search Report and Written Opinion for PCT/US2014/049953, dated Feb. 10, 2015, Applicant, SentiMetal Journey LLC (16 pages).
(Continued)

Primary Examiner — Zelalem Eshete
(74) Attorney, Agent, or Firm — Mark A. Dalla Valle; Rosenbaum IP, P.C.

(57) ABSTRACT

An electrical system including a linear motor in which energized forcer and thruster coils are used for the field and armature elements, respectively. In accordance with various exemplary embodiments, one or more thruster coils may be provided on a reciprocating shaft with opposing single or multiple fixed forcer coils. Using coils as the electromagnets for both forcer and thruster coils advantageously provides necessary power while also minimizing system weight and decreases in magnetism typically encountered with permanent magnets with rising temperature, resulting in higher and more controllable magnetic forces over varying temperatures. A ferrous system housing and open ferrous containers for the thruster coils may be further included to advantageously focus the magnetic forces. Additionally, multiple forcer and thruster coils may be disposed in various arrangements along the reciprocating shaft. Exemplary applications include use of such a system for controlling oscillations of a poppet valve in an internal combustion engine.

37 Claims, 11 Drawing Sheets

(51) Int. Cl.
*H02K 33/12* (2006.01)
*H02K 41/03* (2006.01)
*F01L 13/00* (2006.01)
*F16K 31/04* (2006.01)
*H02K 41/02* (2006.01)
*H02P 1/00* (2006.01)

(52) U.S. Cl.
CPC ........... *H02K 41/02* (2013.01); *H02K 41/031* (2013.01); *H02P 1/00* (2013.01); *F01L 2009/0401* (2013.01); *F01L 2009/0405* (2013.01); *F01L 2009/0407* (2013.01); *F01L 2013/103* (2013.01)

(56) References Cited

U.S. PATENT DOCUMENTS

| | | | |
|---|---|---|---|
| 4,404,503 A * | 9/1983 | Ward | H02K 35/00 310/30 |
| 4,794,890 A | 1/1989 | Richeson, Jr. | |
| 5,188,336 A | 2/1993 | Graner et al. | |
| 5,572,961 A | 11/1996 | Schechter et al. | |
| 5,598,814 A | 2/1997 | Schroeder et al. | |
| 5,873,335 A | 2/1999 | Wright et al. | |
| 5,983,847 A | 11/1999 | Miyoshi et al. | |
| 6,047,672 A | 4/2000 | Hanai et al. | |
| 6,247,431 B1 | 6/2001 | Toriumi | |
| 6,274,954 B1 * | 8/2001 | Gander | F01L 9/04 310/17 |
| 6,293,303 B1 | 9/2001 | Mori et al. | |
| 6,318,312 B1 | 11/2001 | Bauer et al. | |
| 6,321,701 B1 | 11/2001 | Vorih et al. | |
| 6,390,443 B1 | 5/2002 | Katayama et al. | |
| 6,397,797 B1 | 6/2002 | Kolmanovsky et al. | |
| 6,666,178 B1 | 12/2003 | Keller et al. | |
| 6,729,279 B1 | 5/2004 | Lundqvist et al. | |
| 6,736,092 B2 | 5/2004 | Borean et al. | |
| 7,047,919 B2 | 5/2006 | Morin et al. | |
| 7,225,770 B2 | 6/2007 | Simpson | |
| 7,392,774 B2 | 7/2008 | Magner et al. | |
| 7,869,929 B2 | 1/2011 | Sugihara | |
| 7,878,480 B2 | 2/2011 | Vattaneo et al. | |
| 8,056,541 B1 | 11/2011 | Nick | |
| 8,087,392 B2 | 1/2012 | Swanbon et al. | |
| 8,374,769 B2 | 2/2013 | Moriya | |
| 8,402,742 B2 | 3/2013 | Tripathi et al. | |
| 8,402,942 B2 | 3/2013 | Tripathi et al. | |
| 2002/0145124 A1 | 10/2002 | Kabasin | 251/54 |
| 2003/0168030 A1 | 9/2003 | Muraji | 123/90.11 |
| 2004/0031455 A1 | 2/2004 | Muraji | |
| 2004/0113731 A1 | 6/2004 | Moyer et al. | |
| 2004/0150269 A1 * | 8/2004 | Maki | H02K 41/03 310/12.24 |
| 2005/0016478 A1 * | 1/2005 | Mizuta | F01L 9/04 123/90.11 |
| 2005/0126521 A1 | 6/2005 | Simpson | |
| 2006/0213467 A1 | 9/2006 | Roeschle et al. | |
| 2007/0044741 A1 | 3/2007 | Daniel | |
| 2007/0295291 A1 | 12/2007 | Uercho | |
| 2008/0149391 A1 * | 6/2008 | Burkhard | E21B 34/066 175/25 |
| 2011/0234210 A1 | 9/2011 | Hayashi et al. | |
| 2012/0167849 A1 | 7/2012 | Hutchins et al. | |
| 2012/0291727 A1 | 11/2012 | Keller et al. | |
| 2013/0098337 A1 | 4/2013 | Carlson et al. | |
| 2014/0354381 A1 * | 12/2014 | Kohlhafer | H01H 50/20 335/179 |
| 2017/0321620 A1 | 11/2017 | Hutchins | |

FOREIGN PATENT DOCUMENTS

| | | |
|---|---|---|
| JP | 2001-008432 A | 1/2001 |
| JP | 2004-120815 A | 4/2004 |
| JP | 2009-002666 A | 1/2009 |
| JP | 2012-175851 A | 9/2012 |
| SE | 534436 | 8/2011 |

OTHER PUBLICATIONS

Baldor, "Servo, Linear & Motion Control Products Catalog" [online], Apr. 28, 2011, Retrieved from the Internet Archive: http://stevenengineering.com/Tech.sub.--Support/PDFs/92SERVO.sub.--LINEAR-.sub.--Motion.pdf, (56 pages).

MD Forhad Khandaker, Voice Coil Actuated Variable Valve Timing System for Spark Ignition Engines, Mar. 2006, Concordia University, Montreal Quebec Canada, Department of Mechanical and Industrial Engineering, (171 pages).

Autozine Technical School, Continuous Variable Valve Lift (CVVL), http://www.autozine.org/technical.sub.--school/engine/vvt.sub.--5.html, Jan. 1, 1997.

Edgar, Julian, BMW's Valvetronic! The first petrol engine without a throttle butterfly? http://www.autospeed.com/cms/A.sub.--111539/article.html, Jan. 1, 2001, (2 pages).

European Patent Office Communication pursuant to Article 94(3) dated Mar. 27, 2018, for European Application No. 14834447.6 1007, Applicant, SentiMetal Journey LLC (4 pages).

Wikipedia article on linear motors: https://en.wikipedia.org/wiki/Linear_motor; printed from the internet on Jan. 23, 2018 (7 pages).

Lin Mot®, a vendor of PM vs coil linear motors: http://www.linmot.com/products/linear-motors/; printed from the internet on Jan. 23, 2018 (5 pages).

Kollmorgen, John Floresta, Oct. 1, 2000; MachineDesign®: http://www.machinedesign.com/linear-motion/driving-linear-motors; printed from the internet on Jan. 23, 2018 (7 pages).

http://www.moticont.com/voice-coil-motor.htm; printed from the internet on Jan. 23, 2018 (1 page).

© 2016 BEI Kimco, http://www.beikimco.com/resources-downloads/about-VCAs/what-is-a-voice-coil-actuator, printed from the internet on Jan. 23, 2018, (3 pages).

http://www.beikimco.com/motor-products/VCA-linear-voice-coil-actuator-all; printed from the internet on Jan. 23, 2018, (2 pages).

Wikipedia article on linear induction motor: https://en.wikipedia.org/wiki/Linear_induction_motor; printed from the internet on Jan. 23, 2018, (2 pages).

© 1994-2018 Aerotech, Inc., https://www.aerotech.com/product-catalog/motors/linear-motor.aspx; printed from the internet on Jan. 23, 2018, (4 pages).

© Copyright 2013 Kollmorgen; https://www.kollmorgen.com/en-us/products/motors/direct-drive/direct-drive-linear/; printed from the internet on Jan. 23, 2018, (1 page).

Maccon; https://www.maccon.de/en/linear-motors.html; printed from the internet on Jan. 23, 2018, (1 page).

Barrett, Jack et al., Parker Hannifin Corporation, "Linear Motor Basics", printed from the internet on Jan. 23, 2018, (8 pages).

Japanese Office Action for JP Application No. 2016-533402, with English translation, dated Jun. 28, 2018, Applicant, SentiMetal Journey, LLC, (6 pages).

Japanese Office Action for JP Application No. 2016-533402, dated Jun. 28, 2018, Applicant, SentiMetal Journey, LLC, (13 pages).

https://newatlas.com/camcon-digital-iva-valve-system/55827/?utm_medium=email&utm_campaign=2018-08-13%20143300%20USA%20Daily%20Basic%202018-08-13%20143956%20Worlds%20first%20fully%20digital%20valves%20open%20up%20engine%20possibilities&utm_content=2018-08-13%20143300%20USA%20Daily%20Basic%202018-08-13%20143956%20Worlds%20first%20fully%20digital%20valves%20open%20up%20engine%20possibilities+CID_c363d546d8b28da88e5b649db646bb5c&utm_source=Campaign%20Monitor, New Atlas, "World's first fully digital valves open up engine possibilities," Printed from the internet Aug. 11, 2018, (12 pages).

Chang, W.S., et al., "A New Electromagnetic Valve Actuator," Massachusetts Institute of Technology, Laboratory for Electronic and Electromagnetic Systems, Oct. 24, 2002, (10 pages).

Liu, Jieng-Jang et al., "Electromechanical Valve Actuator with Hybrid MMF for Camless Engine," Proceedings of the 17th World

(56) References Cited

OTHER PUBLICATIONS

Congress, The International Federation of Automatic Control, Seoul, KR, Jul. 6-11, 2008, Department of Mechanical Engineering, National Taiwan University, Taiwan, pp. 10698-10703, (6 pages).
"Electromechanical Valve Actuator for Variable Valve Timing," updated Jul. 20, 2014, http://www.launchpnt.com/portfolio/transportation/electromechanical-valve-actuator, © 2017 LaunchPoint Technologies Inc., *Magnetic Moments*™ Academic Products, (9 pages).
Wikipedia, "Camless Piston Engine," Printed from the internet on Jun. 1, 2008, https://en.wikipedia.org/wiki/Camless_piston_engine, (9 pages).
Lin Mot®, http://www.linmot.com/products/linear-motors/; printed from the internet on Jan. 23, 2018, (5 pages).
Wikipedia article on linear induction motor: https://en.wikipedia.org/wiki/Linear_induction_motor; printed from the internet on Jan. 23, 2018, (5 pages).
International Search Report and Written Opinion issued in corresponding foreign application, PCT/US2020/017422, pp. 1-8 (dated Jun. 12, 2020).

* cited by examiner

HIGHLY EFFICIENT LINEAR MOTOR

RELATED APPLICATION

This application claims priority from U.S. Patent Application 62/634,592, entitled "Highly Efficient Linear Motor" and filed on 23 Feb. 2018, the contents of which are incorporated herein by reference.

FIELD

The present invention relates generally to linear motors and control systems therefor for various applications.

BACKGROUND

Many types of linear motors are currently made for many different applications. There are two basic types of linear motors, circular and flat. Circular motors include, voice coil motors, voice coil actuators, and linear motors—sometimes called tubular motors, and are generally used for high force, small distance motors. Circular motors generally use a central member that would be an armature in a rotary motor and an outer member that surrounds the central member and would be a field in a rotary motor. The armature of the rotary motor is the thruster in a linear motor and the field of the rotary motor is the forcer. Flat linear motors are linear motors that are laid out flat, with coils and magnets alongside each other, with linear bearings that constrain the moving member and are generally used for intermediate distance movement. This flat type of linear motor can include electromagnets on both the moving and stationary side, as recited in published US Patent Application 2017/0047821 A1. Flat linear motors include linear induction motors, which are well known with the widest use in mass transit trains over long distances, sometimes with magnetic levitation. These have been known for quite a while as evidenced by U.S. Pat. No. 782,312 which was granted on Feb. 14, 1905 for a magnetic levitation application. Linear synchronous motors are also used for mass transit trains and may use electro magnets for both the fixed magnet and the moving magnet with both driven by multi-phase synchronized electronic drive systems.

Today's linear motors utilized for rapid movements from fractional distances to several inches, generally use one or more coils, one or more permanent magnets and a control system that delivers power to the coil(s) to control movement of the linear motor. Current efforts to improve the power and electrical efficiency of small distance, high speed, linear motors has involved the use of more and more powerful permanent magnets, typically using rare earths such as neodymium. These rare earth permanent magnets are quite strong but very expensive and if subjected to heat, see decreases in their strength proportional to the increased heat, as do all permanent magnets. The decrease in strength at elevated temperature hampers the use of linear motors in some applications, such as in internal combustion engines (ICEs). The decrease in magnetic strength with elevated temperature varies from magnet to magnet, additionally decreasing with increasing temperature at slightly varying rates from magnet to magnet, resulting in a change that cannot be compensated for by standard equations.

Due to the deficiencies of these prior attempts, there remains the need to provide an efficient linear motor that can operate at elevated temperatures. The improved linear motor presented here can serve in many applications while subject to elevated temperatures, including in actuation systems for the poppet valves of an ICE that reduce cost, weight and complexity, while providing for fully independent control of the valve actuation parameters.

SUMMARY

An electrical system including a linear motor in which energized forcer and thruster coils are used for the field and armature elements, respectively. In accordance with various exemplary embodiments, one or more thruster coils may be provided on a reciprocating shaft with opposing single or multiple fixed forcer coils. Using coils as the electromagnets for both forcer and thruster coils advantageously provides necessary power while also minimizing system weight and decreases in magnetism typically encountered with permanent magnets with rising temperature, resulting in higher and more controllable magnetic forces over varying temperatures. A ferrous system housing and open ferrous containers for the thruster coils may be further included to advantageously focus the magnetic forces. Additionally, multiple forcer and thruster coils may be disposed in various arrangements along the reciprocating shaft. Exemplary applications include use of such a system for controlling oscillations of a poppet valve in an internal combustion engine.

In accordance with exemplary embodiments, a linear motor includes:

a housing including a longitudinal axis and defining an interior region terminated at opposing first and second housing ends that include first and second housing apertures disposed coaxially with the longitudinal axis;

a shaft disposed coaxially with and movably along the longitudinal axis and including opposing first and second shaft ends extending through the first and second housing apertures;

a first forcer coil disposed coaxially with the shaft and affixed within the interior region proximate to the first housing end; and a first thruster coil disposed coaxially with and affixed to the shaft between the first and second shaft ends.

In accordance with further exemplary embodiments, at least one linear motor includes:

a ferrous housing including a longitudinal axis and defining an interior region terminated at opposing first and second housing ends that include first and second housing apertures disposed coaxially with the longitudinal axis;

a shaft disposed coaxially with and movably along the longitudinal axis and including opposing first and second shaft ends extending through the first and second housing apertures;

a first forcer coil disposed coaxially with the shaft and affixed within the interior region proximate to the first housing end;

a second forcer coil disposed coaxially with the shaft and affixed within the interior region proximate to the second housing end;

a first thruster coil disposed coaxially with and affixed to the shaft between the first and second shaft ends;

a second thruster coil disposed coaxially with and affixed to the shaft proximate to the first thruster coil;

a first open ferrous container that is disposed coaxially with the shaft and circumferentially about the first thruster coil, and is open toward the first forcer coil;

a second open ferrous container that is disposed coaxially with the shaft and circumferentially about the second thruster coil, and is open toward the second forcer coil;

at least one electrical power source; and a power controller electrically coupled between the at least one electrical power source and the first and second forcer coils and the first and second thruster coils, and including memory and one or more processors configured to store and execute a plurality of instructions that when executed cause electrical power to be applied to the first and second forcer coils and the first and second thruster coils such that the shaft
  is urged to move toward the first housing end to a first longitudinal location, and
  is caused to remain stationary at the first longitudinal location during a time interval.

In accordance with further exemplary embodiments, a method for driving a linear motor includes:
  applying, to a first forcer coil that is disposed coaxially with and stationary relative to a reciprocating shaft, a first voltage having one of first mutually opposing polarities and inducing a first forcer magnetic field; and
  applying, to a first thruster coil that is disposed coaxially with and affixed to the reciprocating shaft, a second voltage having one of second mutually opposing polarities and inducing a first thruster magnetic field;
  wherein
    responsive to applying the first and second voltages having a combination of the first and second mutually opposing polarities, the first forcer and thruster magnetic fields are mutually attractive and urge the reciprocating shaft to move the first thruster coil toward the first forcer coil, and
    responsive to applying the first and second voltages having a different combination of the first and second mutually opposing polarities, the first forcer and thruster magnetic fields are mutually repellant and urge the reciprocating shaft to move the first thruster coil away from the first forcer coil.

DETAILED DESCRIPTION

Figure 1:
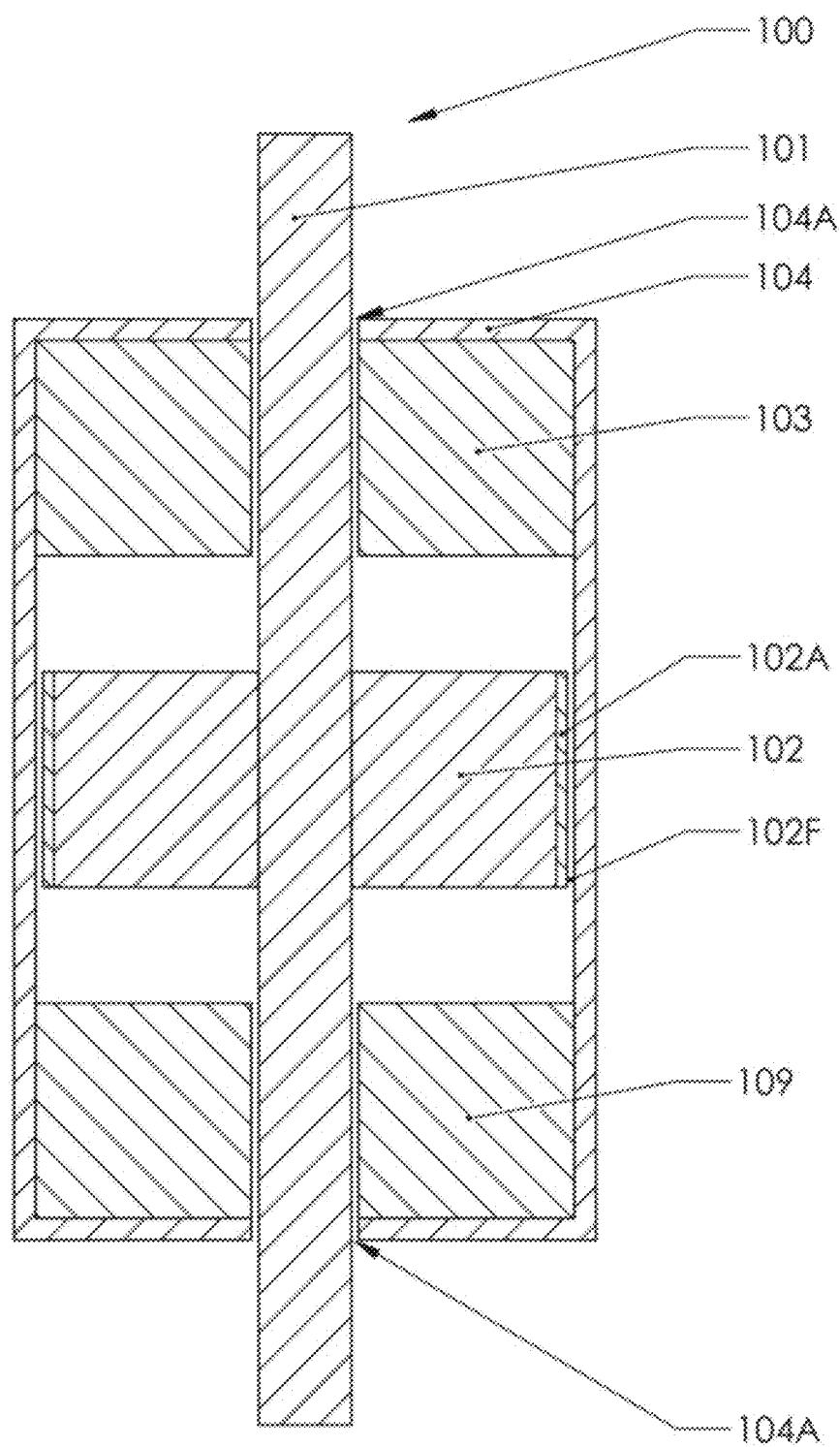
FIG. 1 is a cross sectional side view of a linear motor in accordance with exemplary embodiments.

As discussed in more detail below, deficiencies discussed above are addressed by providing for an improved linear motor and method of operation that have many applications, including a system for actuating valves in an ICE using such a linear motor to variably control the movement of a valve with a high degree of accuracy and speed. Linear motors will be understood by those of ordinary skill in the art to include voice coil motors with fixed coils, moving coils, fixed magnets and moving magnets, single and multiple coils, single and multiple magnets, linear motors—sometimes called linear actuators, using multiple coils and multiple magnets and other types of linear motors, and linear motors that include sets of coils and/or magnets laid out linearly next to each other. The moving magnetic part in a linear motor is referred to as the thruster and the fixed magnetic part is referred to as the forcer.

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The linear motor of the present invention can be configured to operate in many different applications, including controlling the valves of an internal combustion engine (ICE). This linear motor has far more power and controllability than previous linear motors and can operate in many applications that previously required gear motors or other forms of torque multiplier actuators.

The linear motor of the present invention has tremendous advantages over gear motors and other torque multiplier mechanisms because the linear motor has no backlash and needs no gear drives that can break or strip due to wear and overstress or require occasional lubrication. When the linear motor of the present invention is overstressed it will simply hold steady—or even be pushed in one direction or the other, but if properly electrically controlled and protected, will resume control after the overstress is removed—without any damage to the linear motor or loss of ability to control the apparatus. The higher power of the present invention linear motor allows its use in higher speed and higher power applications with greater accuracy to ideal performance. The present invention linear motor can be driven by a dedicated Electronic Control Unit (ECU) that contains the rules, algorithms and/or look-up tables of the application, by an overall controller which controls other aspects of the application, or by any combination of these needed to provide complex motion control for a wide range of applications.

The acts, modules, logic and method steps discussed herein below, according to certain embodiments of the present invention, may take the form of a computer program or software code stored in a tangible machine-readable medium (or memory) in communication with a control unit, comprising a processor and memory, which executes the code to perform the described behavior, function, features and methods. It will be recognized by one of ordinary skill in the art that these operations, structural devices, acts, logic, method steps and modules may be implemented in software, in firmware, in special purpose digital logic, and any combination thereof without deviating from the spirit and scope of the present invention as recited within the claims attached hereto.

When used in an ICE, operating according to Otto, Diesel or some variant of these cycles (e.g. Miller or Atkinson), the timing, lift, duration, and speed of the individual valves in the ICE can be adjusted independently from the crankshaft rotational speed and each valve independently from the actuation of any of the other valves. Thus, for example, an engine with dual intake and/or dual exhaust valves for each cylinder can have each member of the pair of valves open and close with different timing, duration, lift, and speed—or even not operate—to achieve desired engine performance throughout the entire operational speed and load range of the engine. The valve opening and closing speed can be increased as the engine speed and lift increase to maintain performance accuracy and valve opening/closing operations can also be controllably dampened to enhance reliability. The assembly and system are simple, lightweight and low cost compared to prior attempts at improved valve actuation systems, as discussed herein.

Referring to FIG. 1, a diagram is provided to illustrate the components of the present invention linear motor 100 according to exemplary embodiments. The central shaft 101 of the linear motor may be made of non-ferrous material, have a thruster coil 102 fixedly attached to it and reciprocate through apertures 104A in opposing ends of a housing 104, a fixed upper forcer coil 103 and a fixed lower forcer coil 109. The housing 104 is preferably made of ferrous material to guide (e.g., focus or confine) magnetic fields produced by the upper 103 and a lower 109 forcer coils within the interior of the housing 104. The thruster coil 102 may be a single coil that is circumferentially shrouded with a ferrous sleeve 102A (to guide the magnetic field produced by the thruster coil 102 within the interior of the housing 104) with an air gap 102F between the exterior of the ferrous sleeve 102A and the interior surface of the housing 104. The upper 103 and lower 109 forcer coils are shown as single coils for simplicity but may each be implemented using multiple coils that may be driven independently of each other. Bearings or bushings may be affixed within the housing apertures 104A to center and align the central shaft 101 but are omitted here for clarity.

Figure 1A:
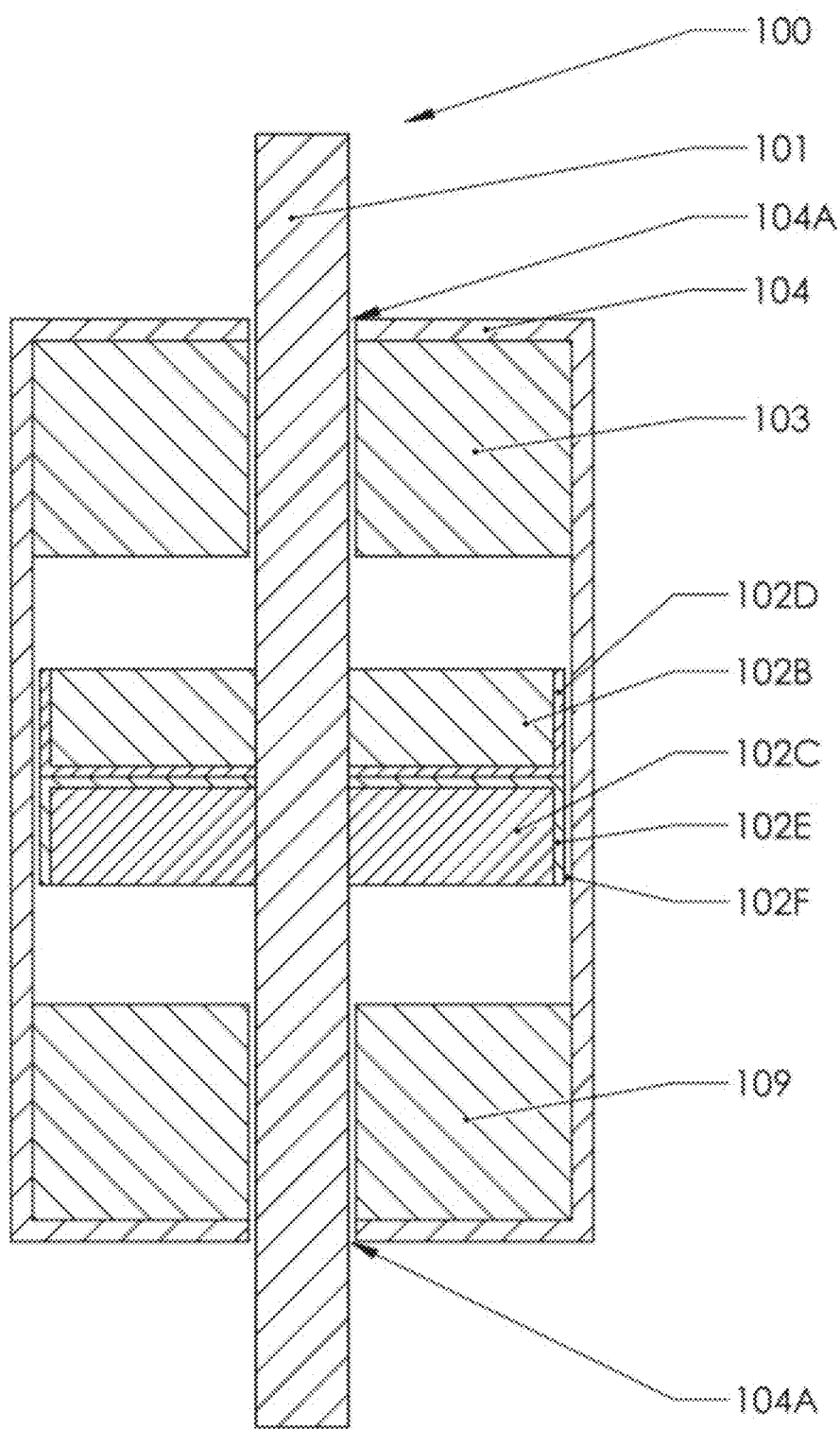
FIG. 1A is a cross sectional side view of a second linear motor in accordance with exemplary embodiments.

Referring to FIG. 1A, alternative exemplary embodiments of a linear motor 100 may include a thruster coil embodied as two coils 102B, 102C, with each in a respective ferrous cup 102D, 102E, with the cup openings facing away from each other, and each facing toward the nearest forcer coil 103, 109, with the thruster coils 102B, 102C and cups 102D, 102E fixedly attached to the central shaft 101 and with the thruster coils 102B, 102C wound such that they may be electrically connected in parallel so as to attract each other when energized. Bearings or bushings may be affixed to the housing apertures 104A to center and align the central shaft 101 but are omitted for clarity.

Figure 2:
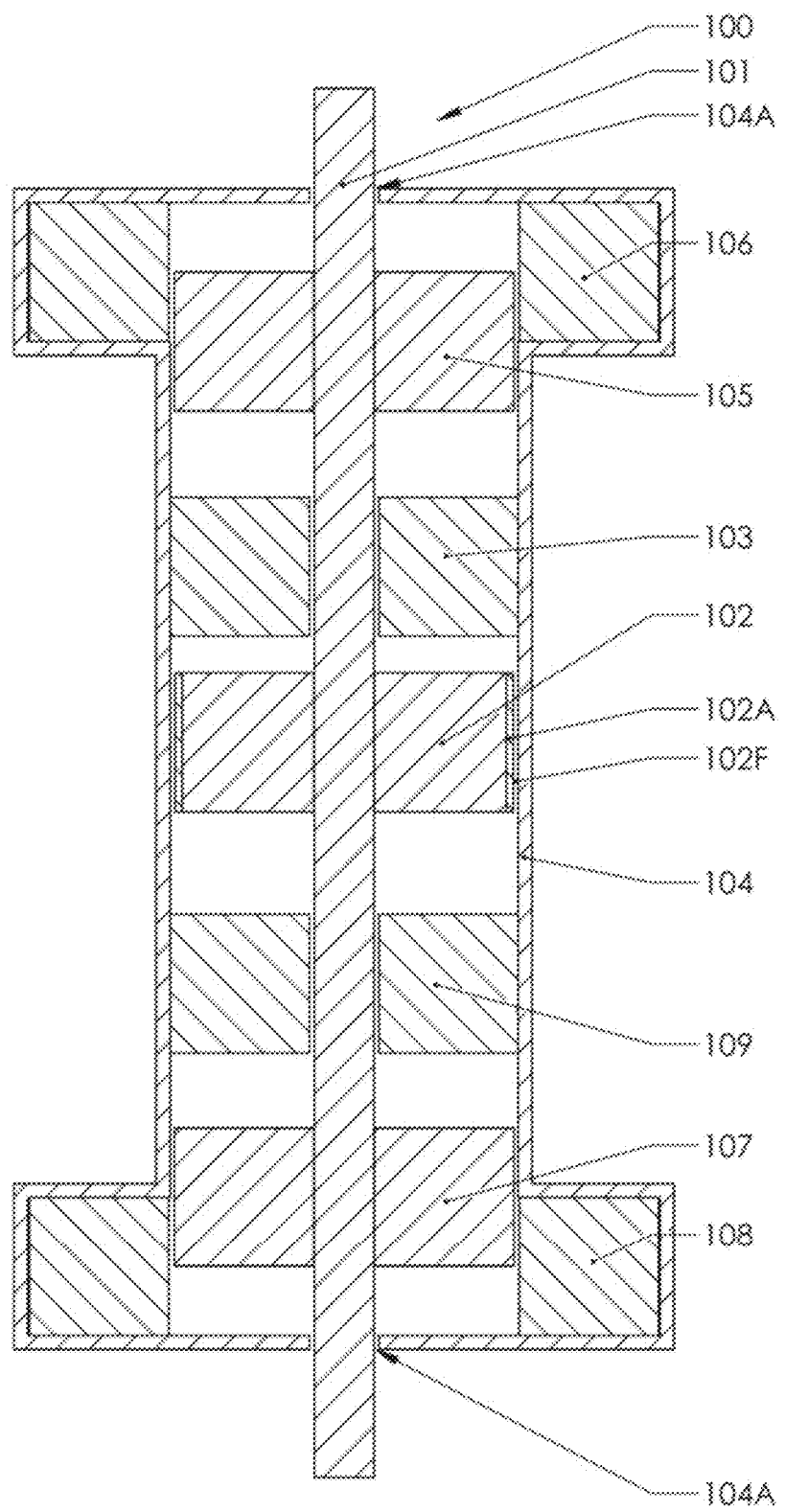
FIG. 2 is a cross sectional side view of a third linear motor in accordance with exemplary embodiments.

Referring to FIG. 2, further alternative exemplary embodiments may include additional stationary forcer coils 106, 108 fixed to the housing 104 and additional thruster coils 105, 107 fixedly attached to the central shaft 101 to hold the linear motor 100 at either of the two fully extended positions, referred to as "open" and "closed" for differentiation. For example, the upper forcer coil 106 and thruster coil 105 can hold the central shaft 101 in the upper, or closed, position, while the lower forcer coil 108 and thruster coil 107 can hold the central shaft 101 in the lower, or open, position. These additional hold-open 108, 107 or hold-closed 106, 105 coil sets need not have the power of the primary forcer coils 103, 109 and thruster coil(s) 102, since they are intended to softly and precisely place the central shaft 101 in the selected end position (e.g., open or closed) and hold it there with minimal power. The words open and closed are used here only to differentiate maximum movement of the linear motor armature in one direction from maximum movement in the other direction and have no other meaning.

Figure 2A:
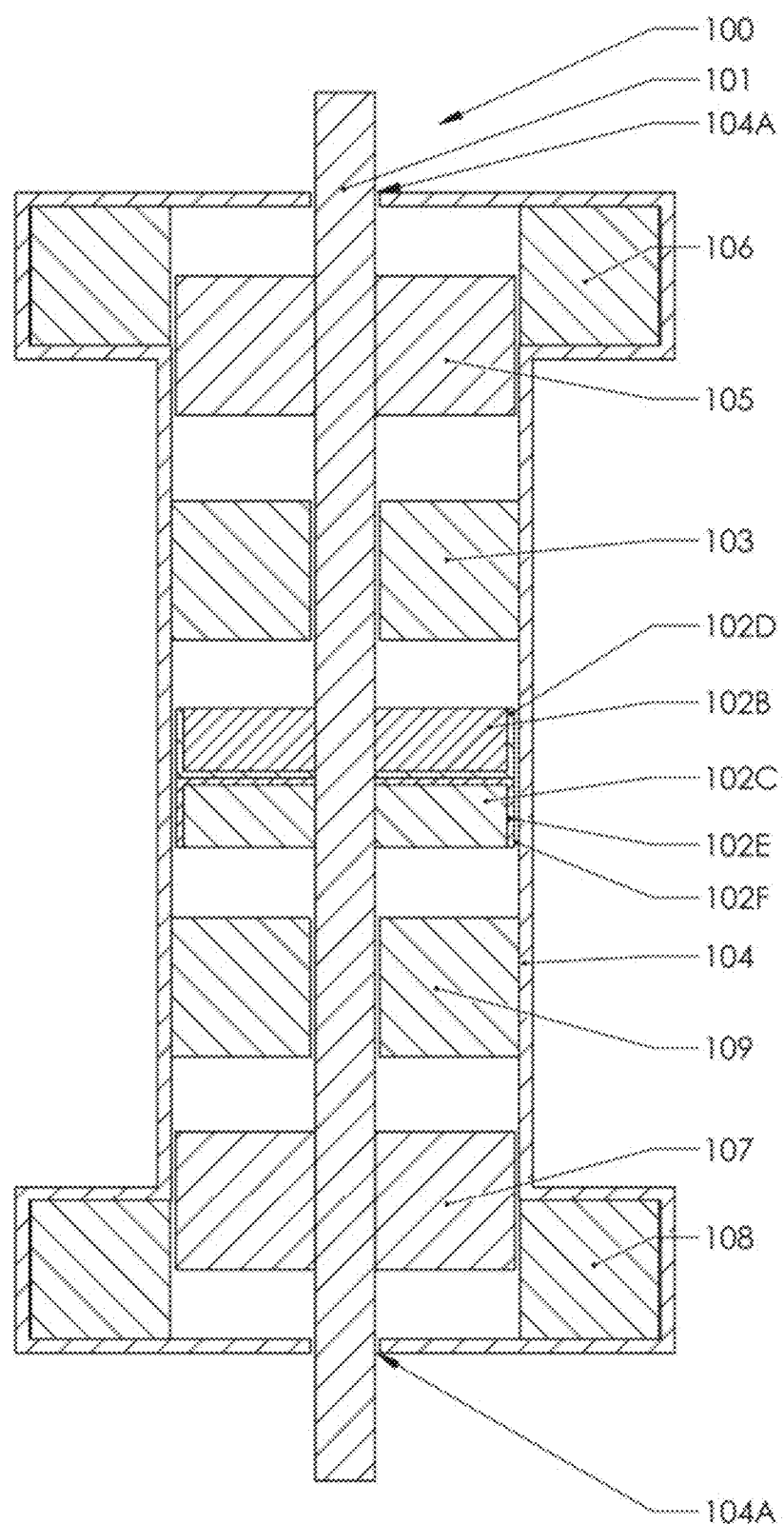
FIG. 2A is a cross sectional side view of a fourth linear motor in accordance with exemplary embodiments.

Referring to FIG. 2A, further alternative exemplary embodiments may include back-to-back thruster coils 102B, 102C and cups 102D, 102E as discussed above for FIG. 1A.

Figure 3:
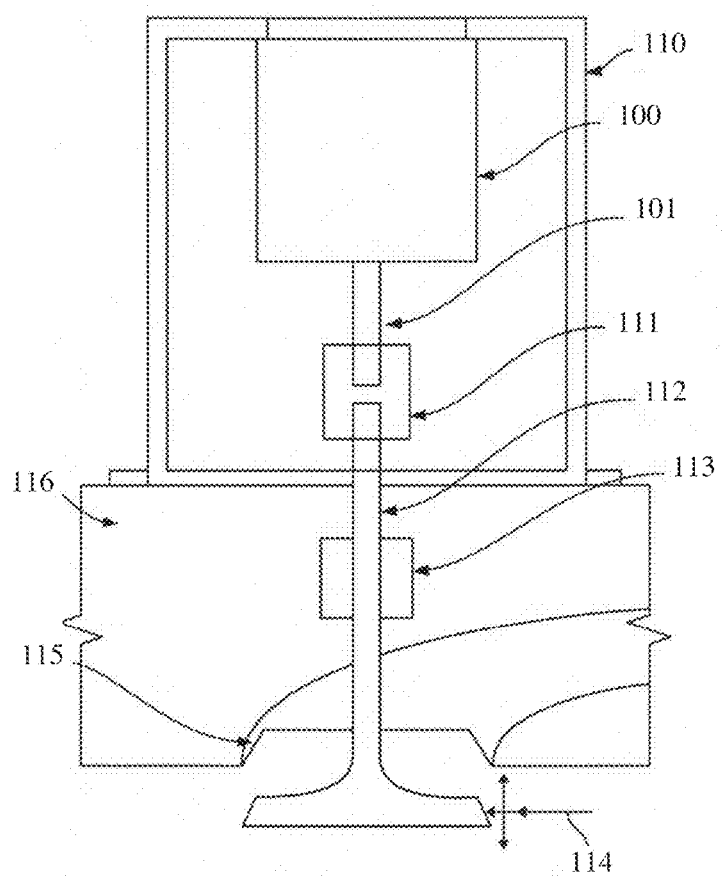
FIG. 3 is a cross sectional side view of an internal combustion engine valve connected to a linear motor in accordance with exemplary embodiments.

Referring to FIG. 3, further alternative exemplary embodiments may include connection to the valve stem of an ICE. Alternatively, such embodiments may be built around the valve stem of an ICE. For example, the linear motor 100 of FIG. 1, 1A, 2 or 2A may be attached to an outer housing 110 which is itself attached to the ICE head 116, with the central shaft 101 of the linear motor 100 affixed via a coupling 111 to the valve stem 112 of the ICE to oscillate the valve head 114 from closed on the valve seat 115 in the ICE head 116 to fully open and all positions in between. A serviceable valve guide 113 may be fixed in the ICE head 116 to precisely position the ICE valve stem 112.

Figure 3A:
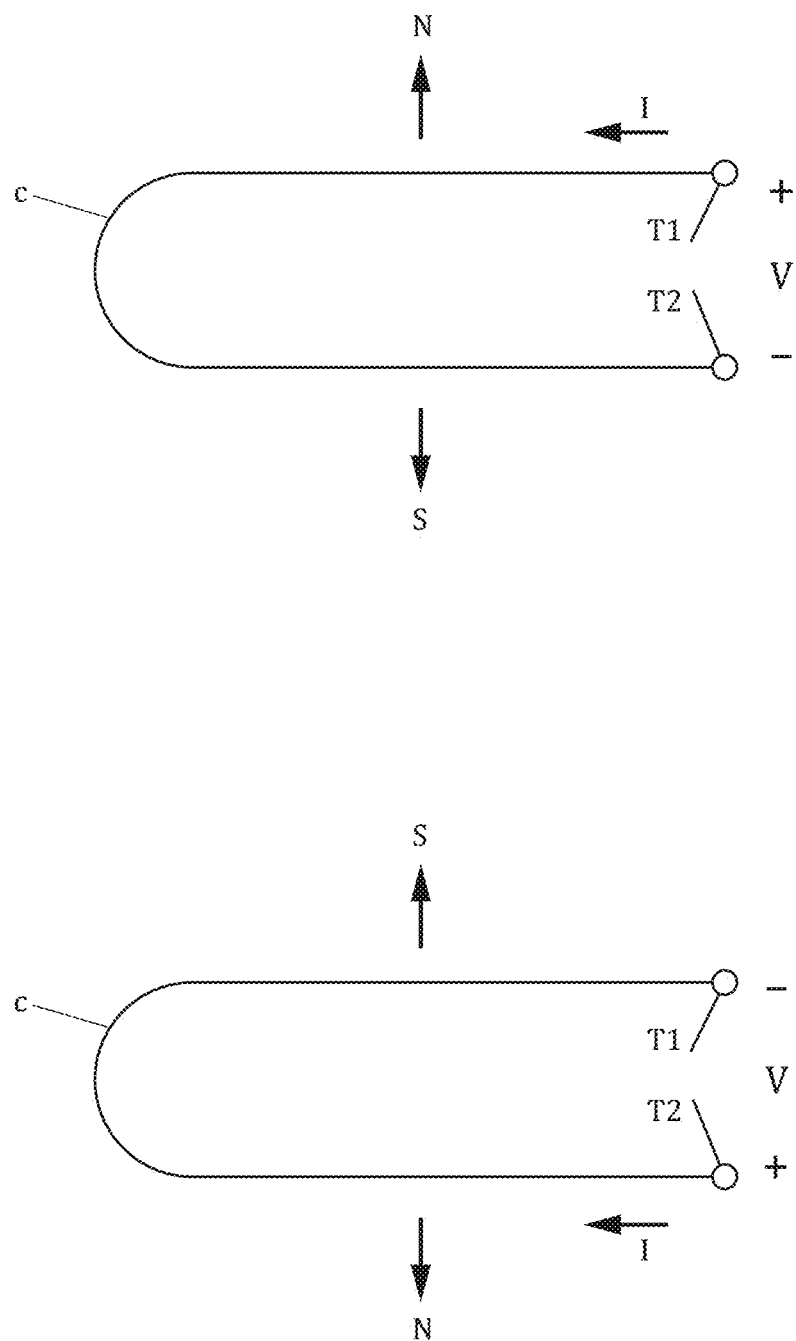
FIG. 3A depicts relationships between direct current (DC) flow and polarities of resulting magnetic fields.

Referring to FIG. 3A, in accordance with well-known scientific principles, magnetic fields may be generated at will. More particularly, for purposes of present exemplary embodiments, each forcer and thruster coil may be implemented as a coil C of multiple loops of an electrical conductor (e.g., insulated strands of metal wire) across which a DC voltage V is applied to produce a DC current I flow through the coil. (The coil C here is depicted as a single loop for simplicity, but it will be readily appreciated that for producing stronger magnetic fields in practical applications multiple loops will be used.) This current I, in turn, produces a magnetic field having opposing north N and south S magnetic poles. As depicted here, switching the polarity of the applied voltage V at the two terminals T1, T2 of the coil C causes a switch in the direction of 3 current I flow through the coil C, which, in turn, causes a switch in the direction of the north N and south S magnetic poles. As discussed below, these principles are used advantageously by energizing the various forcer and thruster coils such that opposite poles (north N and south S) face each other when it is desired to create an attracting force to draw the coils together, and like poles (north N and north N, or south S and south S) face each other when it is desired to create a repelling force to cause the coils to repel one another.

Figure 4:
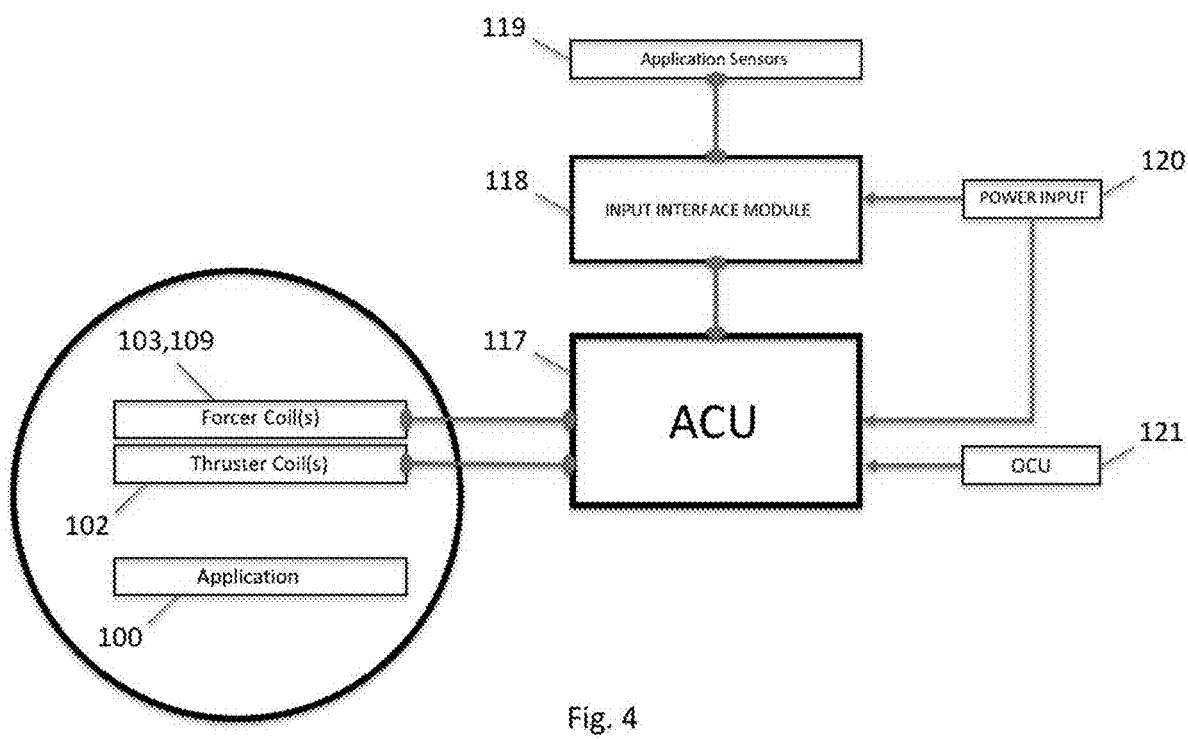
FIG. 4 is a block diagram of the components of a linear motor controller in accordance with exemplary embodiments.

Referring to FIG. 4, in accordance with exemplary embodiments, a linear motor as discussed herein may be applied to an ICE that uses an application control unit (ACU) 117 to control movement of the valve, with inputs to the ACU 117 from an overall control unit (OCU) 121 for the system in which the ICE is installed, e.g. an automobile, generator, truck, etc. In this application the linear motor shaft may be fixedly connected to the ICE valve shaft or the linear motor may be built around the valve stem. The data collected by the application sensor 119, may include without limitation, crankshaft position, engine speed, accelerator position and/or throttle command in a non-vehicular application, and input from the OCU 120 that may contain algorithms for the application and receive data from other sensors particular to the application, e.g., unless they are connected directly to the input interface module 118. The ACU 117 determines inputs from the application sensors 119 and OCU 121, when and how to drive the upper forcer coils 103, lower forcer coils 109 and thruster coil(s) 102, including appropriate voltages, polarities and durations. The additional coil sets shown in FIG. 2 (upper forcer 106 and thruster 105 coil, and lower forcer 108 and thruster 107 coil) may or may not be used in any given application. These additional coil sets, if used, may be driven by independent power supplies (not shown) controlled by the ACU 117. The ACU 117 may also send information from the Application Sensors 119 back to the OCU 121, depending on the application. The OCU 121 controls fuel and ignition for the ICE in this example. As noted above, the ACU 117 selectively energizes the coil assemblies 102, 103, 109 to cause the linear motor shaft 101 to move to a specific position at a specific time, with a specific speed and acceleration. Each of these parameters may be controlled independently for each valve and can also be altered during a single stroke and from one stroke to the next.

For example, the linear motor shaft 101 may be controllably slowed down (decelerated) just before the valve head 114 makes contact with the valve seat 115 so that it does not slam into the seat 115 with excessive force, which would be inefficient and potentially damaging to the valve. This cushioning effect may extend the life of the engine compared to conventional valve assemblies that do not dampen such valve movement. Also, such dampening can be achieved without need for additional springs or other mechanical devices, thereby minimizing complexity and overall cost of the valve train.

Figure 5:
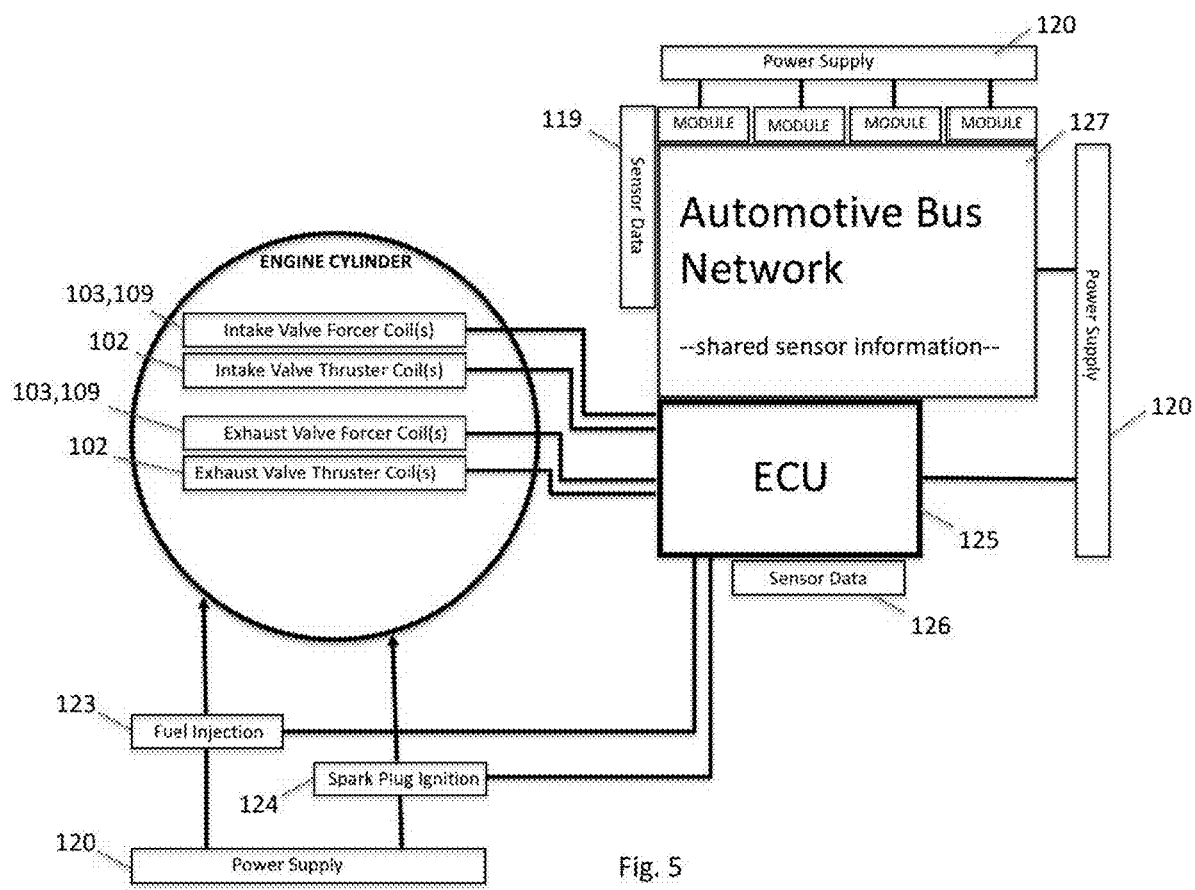
FIG. 5 is a block diagram of components of a controller for an internal combustion engine with valves operated by linear motors in accordance with exemplary embodiments.

Referring to FIG. 5, in accordance with exemplary embodiments, a linear motor as discussed herein may be applied to the valves of an ICE of a motor vehicle controlled by an engine control unit (ECU) 125, and connected to the bus network 127 of the vehicle. The ECU 125, which may include functionality of the ACU 117 and OCU 121 (FIG. 4), may receive sensor data 126 directly from the ICE and vehicle data from the application sensors 119 for the vehicle through the bus network 127, enabling the ECU 125 to control the ICE valve movements, fuel injection and ignition for desired performance. The motor vehicle may be an automobile, bus, truck, motorcycle, off-road vehicle such as tractor or all terrain vehicle, boat or aircraft. The ICE shown has one input valve and one exhaust valve, but multiple input and/or exhaust valves may be operated with the same control functions.

Figure 6:
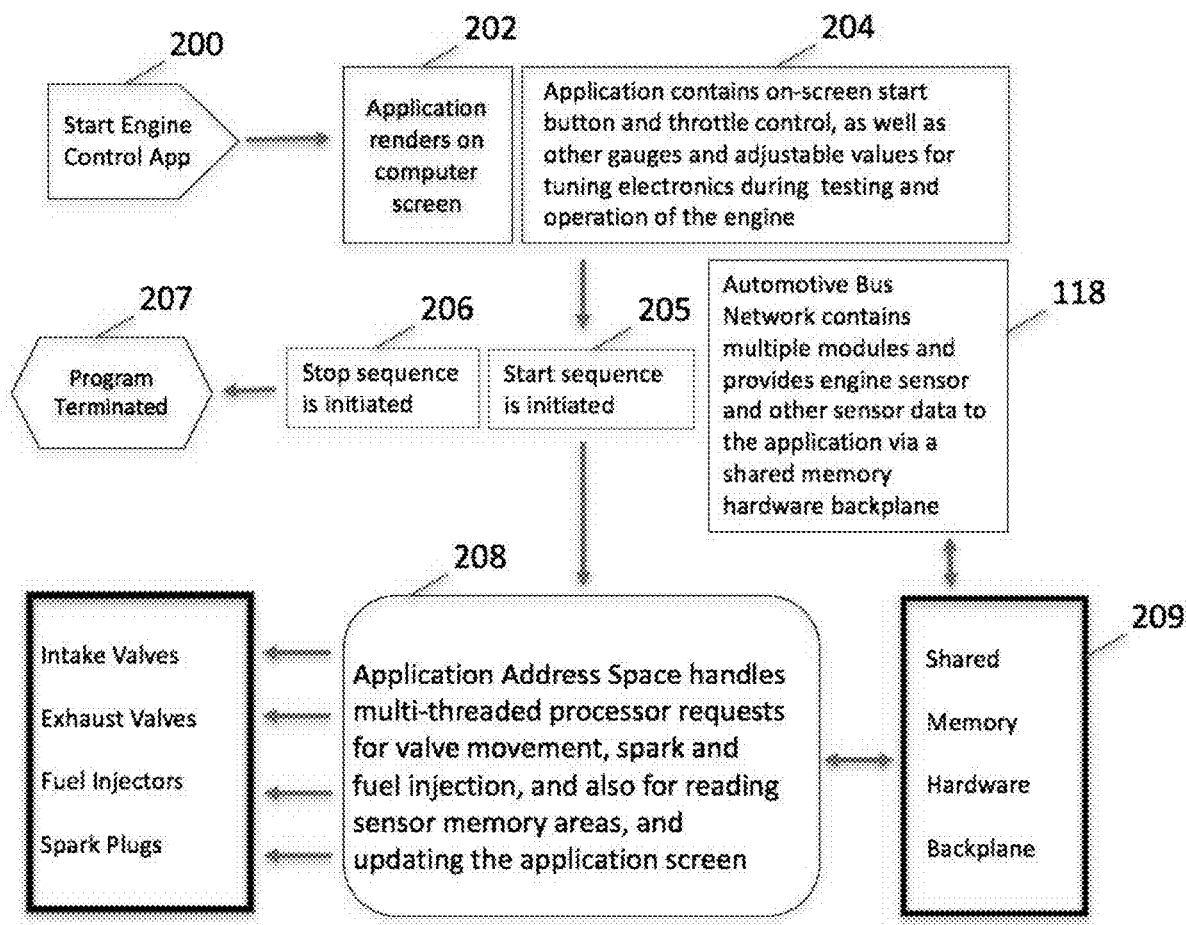
FIG. 6 is a block diagram of an engine start and stop sequence in accordance with exemplary embodiments.

Referring to FIG. 6, in accordance with exemplary embodiments, software program logic may be applied for a linear valve actuator system as discussed herein. This can be used by a manufacturer to alter vehicle ICE operating parameters through a graphical user interface in operative communication with the control system during initial design and programming. A diagnostic application 200 is first initiated. The application may be rendered on a graphical user interface 202 for interaction with the user, e.g., by presenting a plurality of buttons and gauges to the user 204, including start, throttle adjust and digital readouts of key operating parameters such as engine revolutions per minute (RPM).

A sensor hardware interface module 118 may be used, e.g., as depicted in FIG. 4, and connected to an appropriate processor and/or directly to the vehicle bus network 127 and from this bus to an appropriate processor. A sensor hardware interface module may collect the sensor data 126 and convert it to an appropriate format, if needed, for use by the processor when executing the program logic. Additional sensors from the vehicle or application may connect through the vehicle bus network 127.

Upon starting the ICE, the start engine control app 200 is initiated, the application performance update is looped to display 204, a firing sequence program 205 is launched in the application address space 208 and control schedules are retrieved from a shared memory hardware backplane 209 and the application address space processor(s) command the programmed valve operation, fuel delivery, ignition and engine crank to start. Turning the engine off causes the stop sequence 206 to be initiated, which directs the application address space to shut the engine down, and the application is terminated 207.

Figure 7:
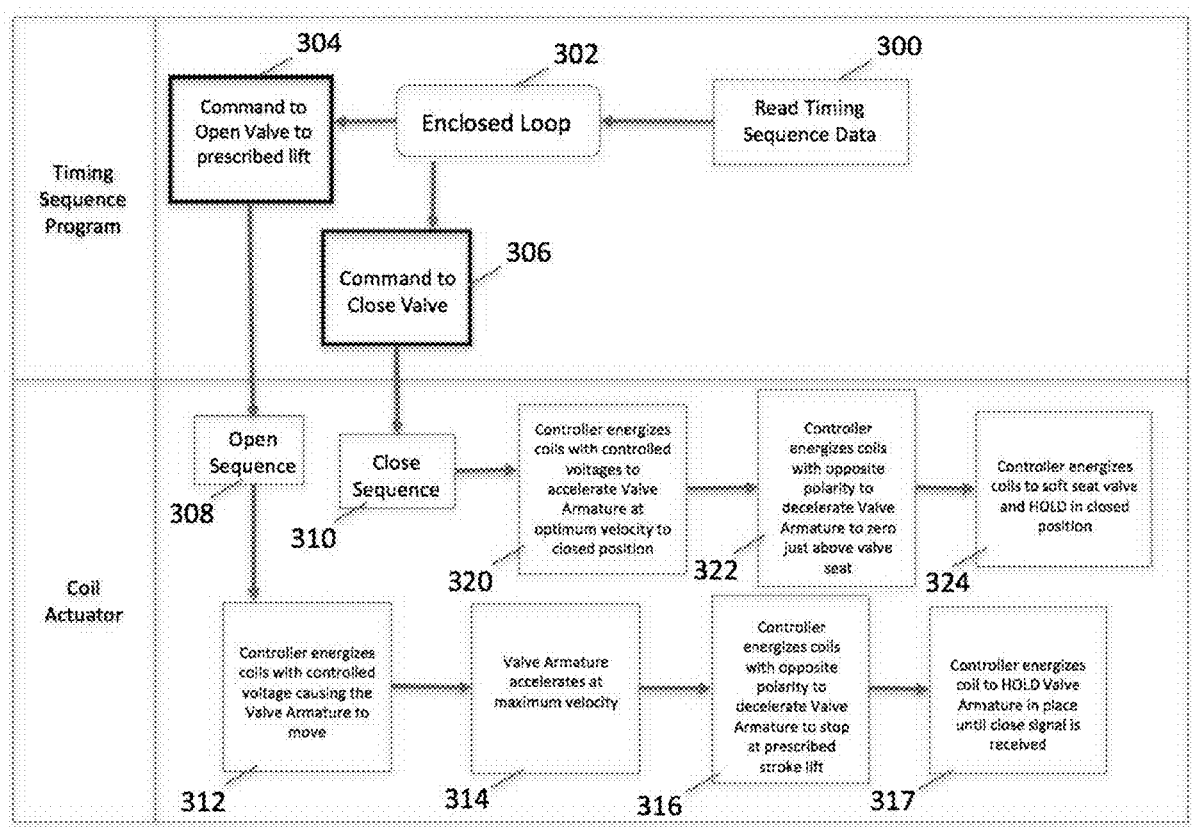
FIG. 7 is a block diagram of a valve opening and closing sequence in accordance with exemplary embodiments.

Referring to FIG. 7, the logic of an open/close sequence in accordance with exemplary embodiments may be applied to control movement of a valve in an ICE. This logic may be duplicated for each of the valves in a multi-valve implementation so that each valve can be controlled individually. The valve timing sequence data is read 300 and inputted into a closed control loop 302. The control loop may include commands to open the valve to a prescribed length or height 304 (often referred to as "lift") and a command to close the valve 306 after a predetermined duration. If the open valve command 304 is given to the linear motor, the open sequence 308 is followed by the linear motor. If the close valve command 306 is given to the linear motor, the close sequence 310 is followed by the linear motor.

In one example, in the open sequence 308, the controller energizes the coils with first controlled voltages to accelerate the valve toward a predetermined open position at a first rate of acceleration 314. At a predetermined point of travel, the controller energizes the forcer coils with second voltages having polarities opposing those of the first controlled voltages to cause the valve to decelerate to zero at a position near the predetermined open position. The controller then energizes the forcer coils with third voltages to hold the valve in the predetermined open position ("lift") for a predetermined duration. In the close sequence 310, the controller energizes the forcer coils with fourth controlled voltages to accelerate the valve toward the closed position at a second rate of acceleration 320. At a predetermined point of travel, the controller energizes the forcer coils with fifth voltages having polarities opposing those of the fourth controlled voltages to cause the valve to decelerate (e.g., to zero) at a position just above the valve seat 322. The controller then energizes the forcer coils with sixth voltages to softly seat the valve against its seat and hold the valve in the seated position 324. Alternatively, the soft seating step 324 can be eliminated and the deceleration step 322 can be used to fully seat the valve, at which time the forcer coil voltage polarities are switched to hold the valve in the closed position until an open command is received.

In accordance with exemplary embodiments, linear motor coils as discussed herein may be driven in different fashions to achieve desired actions. For example, in accordance with exemplary embodiments as depicted in FIG. 1, for an upward movement of the central shaft 101, the upper forcer coil 103 can be driven to attract the central shaft thruster coil 102. For greater power in this upward movement, the lower forcer coil 109 can be driven at the same time to repel the central shaft thruster coil 102. The voltages on all three coils can be varied in polarity and magnitude to precisely manage the rate of movement of the central shaft 101, the distance it moves and then to stop the upward movement and hold the central shaft 101 in an exact desired position. To increase the power applied, the central shaft thruster coil 102 may be implemented as multiple coils 102B, 102C (FIG. 1A) that may be driven together or separately to repel and attract the upper forcer coil 103 and lower forcer coil 109. In accordance with exemplary embodiments as depicted in FIG. 2, the additional hold open coils 107, 108, and hold closed coils 105, 106, may be energized as the central shaft 101 nears the fully open or fully closed positions, as the forcer coils 103, 109 and thruster coil(s) 102 are de-energized, to slow, softly stop and hold the central shaft 101 in the fully open or fully closed position. The terms "open" and "closed" are used only to denote full movement of the linear motor in alternate directions and have no other meaning here.

For example, in the open sequence 308, the computer or controller may energize the forcer coils with independent first forcer voltages and the thruster coil(s) with independent first thruster voltages to cause the valve (head to move in a direction away from the valve seat 312. The valve thus accelerates at an initial rate 314. At a predetermined point of travel, the computer or controller may energize the forcer coils with independent second voltages having opposite polarities 316 to cause deceleration of the valve until the valve stops at a predetermined open position (stroke). The controller or computer may then energize the forcer coils with third independent voltages to hold the valve in place until receiving a close signal 310. In this example, a linear motor as depicted in FIG. 2 may start with the central shaft in the maximum raised direction (closed) and would open by moving down in response to the energizing voltage(s). For example, this may be done by energizing the thruster coil 102 with a first independent voltage creating a first magnetic polarity in the thruster coil, while energizing the upper forcer coil 103 with its first independent voltage to its first magnetic polarity which is the same as the thruster's first polarity, thereby creating an opposing magnetic force between the fixed upper forcer coil and the thruster coil attached to the moving central shaft, and at the same time energizing the lower forcer coil 109 with a first independent voltage to a first magnetic polarity which is the opposite of the thruster's first polarity, thereby creating an attractive magnetic force between the stationary lower forcer coil and the thruster coil attached to the moving central shaft. As the central shaft nears the desired travel distance (stroke), the individual first voltages on the upper and lower forcer coils may be reversed to independent second voltages to slow and stop the central shaft, at which point the voltages on the forcer coils and thruster coils may be changed again to individual third voltages, as determined by the predetermined position of the thruster and central shaft, to hold the central shaft in place for the desired duration. At the end of the open duration, the coils may be energized with individual fourth voltages so that the upper forcer coil attracts the thruster coil in an upward direction and the lower forcer coil repels the thruster coil, then reversing the forcer coil voltages to individual fifth voltages to slow the central shaft near the fully up position, and finally energizing the forcer coils with individual sixth voltages to softly seat the valve and hold it in the closed position. Alternatively, if the linear motor is fitted with holding coils, the forcer coils 103 and 109 and thruster coil 102 may be de-energized and the holding coils 105, 106 individually energized with individual first voltages to softly pull the central shaft into the fully up position and then energized to individual second voltages to hold it there by individually energizing the coils to create opposite magnetic polarities in the coils and by varying the voltage on the coils to adjust the attractive magnetic forces as the central shaft first softly moves to the closed position and then holds in that closed position. A linear motor as described herein may move any distance from very fractionally to the maximum stroke, then hold in that open position and then return to the original position, as commanded by the control system for the given application.

All comments above include single or multiple forcer coils, single or multiple thruster coils and hold-open and/or hold closed coil sets, if used.

Figure 8:
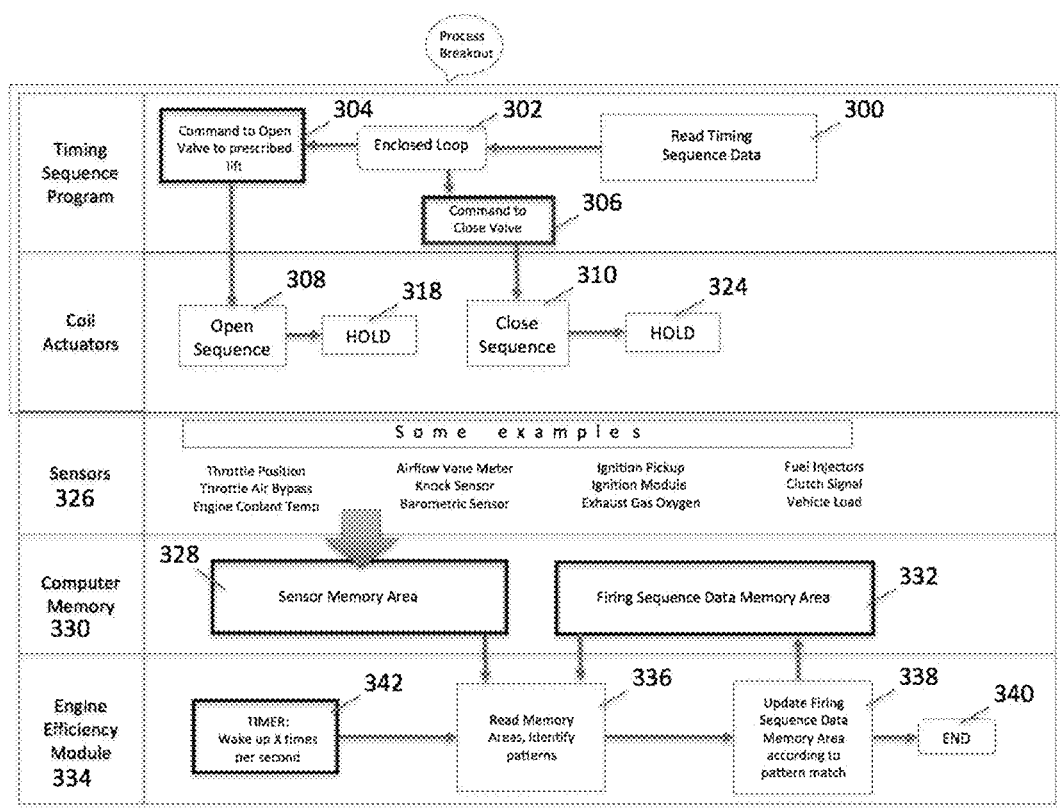
FIG. 8 is a block diagram of a valve operation in an engine in an automobile in accordance with exemplary embodiments.

Referring to FIG. 8, in accordance with further exemplary embodiments, a linear motor as discussed herein may be applied to the valves of an ICE and portions of the valve actuation process flow from the perspective of several components of an ICE management system, including the valve timing sequence program of the computer, the coil actuators, the sensors, memory and the engine efficiency module (which may be software stored in memory of the computer). The timing sequence program includes the previously-described steps of reading the timing sequence data 300, entering the closed loop sequence 302 to command the valve to open 304, as well as commanding the valve to close 306. The coil actuator logic operation includes the previously-described steps of the open sequence 308, holding the valve open 318, the close sequence 310 and holding the valve closed 324.

As the ICE operates, the plurality of sensors 326 (examples include: throttle position, engine speed (RPM), engine coolant temperature, exhaust gas oxygen level, intake airflow meter, knock sensors, barometric pressure sensors, clutch position sensor, transmission gear sensor, vehicle load, etc.) send their respective data to the sensor memory area 328 of the memory module 330 of the computer. The firing sequence data 332 is also stored in memory 330.

An engine efficiency module 334 or logic is also included in the computer or as part of a stand-alone module. This module can be formed as executable software code programmed in non-transitive memory that can be read and executed by a processor included in the computer. The engine efficiency module 334 includes the steps of reading from memory 336 some or all of the sensor data and the firing sequence data. Patterns in the retrieved data are identified and the firing sequence data are updated in the memory area 332 according to the data retrieval and pattern match step 336. The module 334 then ends 340 until woken up 342 periodically. The periodic wakeup signal can be provided by a timer responding to a set time period (e.g., several times per second) or every several revolutions of the crankshaft or every several clock cycles of the computer's processor. The system and logic described above provides for the control device that dynamically adjusts the timing and movement of the valves based upon a wide variety of operating conditions and variables. The engine efficiency module 334 may be continuously adjusted by the user of a motor vehicle, or by the application controller for a non-motor vehicle application, to maximize engine performance for economy, power, minimal emissions, or any combination of these as desired.

Using this system logic, valve position, velocity and acceleration of the central shaft can be varied both during a valve stroke and from one stroke to the next, as controlled by the logic programmed on a non-transitive memory of the electronic valve control computer.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:
1. An apparatus including a linear motor, comprising:
a housing including a longitudinal axis and defining an interior region terminated at opposing first and second housing ends that include first and second housing apertures disposed coaxially with said longitudinal axis;

a shaft disposed coaxially with and movably along said longitudinal axis and including opposing first and second shaft ends extending through said first and second housing apertures;

a first forcer coil disposed coaxially with said shaft and affixed within said interior region proximate to said first housing end; and a first thruster coil disposed coaxially with and affixed to said shaft between said first and second shaft ends;

wherein said shaft is adapted to reciprocate along said longitudinal axis in response to mutually opposing nonpermanent magnetic fields generated by said first forcer and thruster coils.

2. The apparatus of claim 1, wherein said housing comprises a ferrous housing, and further comprising an open ferrous container that is disposed coaxially with said shaft and circumferentially about said first thruster coil, and is open toward said first forcer coil.

3. The apparatus of claim 2, wherein said shaft comprises a stem of a poppet valve for an internal combustion engine.

4. The apparatus of claim 3, further comprising:
at least one electrical power source; and
a power controller electrically coupled between said at least one electrical power source and said first forcer coil and said first thruster coil.

5. The apparatus of claim 2, further comprising a mechanical coupling for mechanically engaging with a stem of a poppet valve for an internal combustion engine.

6. The apparatus of claim 5, further comprising:
at least one electrical power source; and
a power controller electrically coupled between said at least one electrical power source and said first forcer coil and said first thruster coil.

7. The apparatus of claim 2, further comprising:
at least one electrical power source; and
a power controller electrically coupled between said at least one electrical power source and said first forcer coil and said first thruster coil.

8. The apparatus of claim 1, wherein said housing comprises a ferrous housing, and further comprising:
a second forcer coil disposed coaxially with said shaft and affixed within said interior region proximate to said second housing end; and
a ferrous sleeve disposed circumferentially about said first thruster coil.

9. The apparatus of claim 8, wherein said shaft comprises a stem of a poppet valve for an internal combustion engine.

10. The apparatus of claim 9, further comprising:
at least one electrical power source; and
a power controller electrically coupled between said at least one electrical power source and said first forcer coil, said first thruster coil and said second forcer coil.

11. The apparatus of claim 8, further comprising a mechanical coupling for mechanically engaging with a stem of a poppet valve for an internal combustion engine.

12. The apparatus of claim 11, further comprising:
at least one electrical power source; and
a power controller electrically coupled between said at least one electrical power source and said first forcer coil and said first thruster coil and said second forcer coil.

13. The apparatus of claim 8, further comprising:
at least one electrical power source; and
a power controller electrically coupled between said at least one electrical power source and said first forcer coil, said first thruster coil and said second forcer coil.

14. The apparatus of claim 1, wherein said housing comprises a ferrous housing, and further comprising:
a second forcer coil disposed coaxially with said shaft and affixed within said interior region proximate to said second housing end;
a second thruster coil disposed coaxially with and affixed to said shaft proximate to said first thruster coil;
a first open ferrous container that is disposed coaxially with said shaft and circumferentially about said first thruster coil, and is open toward said first forcer coil; and
a second open ferrous container that is disposed coaxially with said shaft and circumferentially about said second thruster coil, and is open toward said second forcer coil.

15. The apparatus of claim 14, further comprising:
at least one electrical power source; and
a power controller electrically coupled between said at least one electrical power source and said first and second forcer coils and said first and second thruster coils.

16. The apparatus of claim 14, further comprising:
a third forcer coil disposed coaxially with said shaft and affixed within said interior region between said first housing end and said first thruster coil;
a third thruster coil disposed coaxially with and affixed to said shaft between said first housing end and said third forcer coil.

17. The apparatus of claim 16, further comprising:
at least one electrical power source; and
a power controller electrically coupled between said at least one electrical power source and said first, second and third forcer coils and said first, second and third thruster coils.

18. The apparatus of claim 1, further comprising:
at least one electrical power source; and
a power controller electrically coupled between said at least one electrical power source and said first forcer coil and said first thruster coil.

19. An apparatus including at least one linear motor, comprising:
a ferrous housing including a longitudinal axis and defining an interior region terminated at opposing first and second housing ends that include first and second housing apertures disposed coaxially with said longitudinal axis;
a shaft disposed coaxially with and movably along said longitudinal axis and including opposing first and second shaft ends extending through said first and second housing apertures;
a first forcer coil disposed coaxially with said shaft and affixed within said interior region proximate to said first housing end;
a second forcer coil disposed coaxially with said shaft and affixed within said interior region proximate to said second housing end;
a first thruster coil disposed coaxially with and affixed to said shaft between said first and second shaft ends;
a second thruster coil disposed coaxially with and affixed to said shaft proximate to said first thruster coil;
a first open ferrous container that is disposed coaxially with said shaft and circumferentially about said first thruster coil, and is open toward said first forcer coil;

a second open ferrous container that is disposed coaxially with said shaft and circumferentially about said second thruster coil, and is open toward said second forcer coil;
at least one electrical power source; and
a power controller electrically coupled between said at least one electrical power source and said first and second forcer coils and said first and second thruster coils, and including memory and one or more processors configured to store and execute a plurality of instructions that when executed cause electrical power to be applied to said first and second forcer coils and said first and second thruster coils such that said shaft
is urged to move toward said first housing end to a first longitudinal location, and
is caused to remain stationary at said first longitudinal location during a time interval.

20. The apparatus of claim 19, wherein said memory and one or more processors are to further store and execute said plurality of instructions that when executed cause electrical power to be applied to said first and second forcer coils and said first and second thruster coils such that said shaft
is urged to move toward said second housing end to a second longitudinal location, and
is caused to remain stationary at said second longitudinal location during another time interval.

21. The apparatus of claim 20, wherein said one or more processors are responsive to one or more sensor signals by executing said plurality of instructions to cause said electrical power to be applied to said first and second forcer coils and said first and second thruster coils such that said shaft
is urged to move toward said first housing end to said first longitudinal location during a first time interval,
is caused to remain stationary at said first longitudinal location during a second time interval,
is urged to move toward said second housing end to said second longitudinal location during a third time interval, and
is caused to remain stationary at said second longitudinal location during a fourth time interval.

22. The apparatus of claim 20, wherein:
said shaft is configured to oscillate a poppet valve for an internal combustion engine between open and closed dispositions; and
said one or more processors are configured to store and execute said plurality of instructions that when executed cause said electrical power to be applied to said first and second forcer coils and said first and second thruster coils such that said shaft
urges said poppet valve to said open disposition at said first longitudinal location during a first time interval,
causes said poppet valve to remain stationary at said open disposition during a second time interval,
urges said poppet valve to said closed disposition at said second longitudinal location during a third time interval, and
causes said poppet valve to remain stationary at said closed disposition during a fourth time interval.

23. The apparatus of claim 22, wherein said one or more processors are further responsive to one or more sensor signals by storing new or modified data in said memory related to said one or more sensor signals.

24. The apparatus of claim 23, wherein:
in accordance with previously stored data in said memory, said first, second, third and fourth time intervals equal first, second, third and fourth proportions, respectively, of a first cycle time interval;
in accordance with said new or modified data, said first, second, third and fourth time intervals equal fifth, sixth, seventh and eighth proportions, respectively, of a second cycle time interval;
said fifth, sixth, seventh and eighth proportions correspond to said first, second, third and fourth proportions, respectively; and
at least two of said fifth, sixth, seventh and eighth proportions differ from said first, second, third and fourth proportions, respectively.

25. The apparatus of claim 23, wherein:
said at least one linear motor comprises a plurality of linear motors including
respective ones of a like plurality of shafts configured to oscillate respective ones of a like plurality of poppet valves for said ICE between respective open and closed dispositions, and
respective pluralities of forcer coils and thruster coils; and
said one or more processors are further configured to store and execute said plurality of instructions that when executed cause said electrical power to be applied to at least a portion of said respective pluralities of forcer coils and thruster coils such that
in accordance with previously stored data in said memory, said electrical power is applied such that said plurality of shafts oscillate said respective ones of a like plurality of poppet valves between said respective open and closed dispositions in one of a plurality of mutually distinct sequences, and
in accordance with said new or modified data, said electrical power is applied such that said plurality of shafts oscillate said respective ones of a like plurality of poppet valves between said respective open and closed dispositions in another of said plurality of mutually distinct sequences.

26. The apparatus of claim 22, wherein said memory and one or more processors are to store and execute said plurality of instructions that when executed cause electrical power to be applied to said first and second forcer coils and said first and second thruster coils such that said shaft
urges said poppet valve toward at least one of said open and closed dispositions at a faster rate during an earlier portion of said third time interval, and
urges said poppet valve to at least one of said open and closed dispositions at a slower rate during a later portion of said third time interval.

27. The apparatus of claim 22, wherein said one or more processors are further configured to store and execute said plurality of instructions that when executed cause initiation of fuel ignition in said internal combustion engine such that:
in accordance with previously stored data in said memory, said fuel ignition is initiated during a portion of said fourth time interval; and
in accordance with said new or modified data, said fuel ignition is initiated during another portion of said fourth time interval.

28. The apparatus of claim 22, wherein said one or more processors are further configured to store and execute said plurality of instructions that when executed cause initiation of fuel injection in said internal combustion engine such that:
in accordance with previously stored data in said memory, said fuel injection is initiated during a proportion of one or more of said first, second, third and fourth time intervals; and in accordance with said new or modified data, said fuel injection is initiated during another proportion of one or more of said first, second, third and fourth time intervals.

29. A method for driving a linear motor, comprising:
applying, to a first forcer coil that is disposed coaxially with and stationary relative to a reciprocating shaft, a first voltage having one of first mutually opposing polarities and inducing a first nonpermanent magnetic forcer field; and
applying, to a first thruster coil that is disposed coaxially with and affixed to said reciprocating shaft, a second voltage having one of second mutually opposing polarities and inducing a first nonpermanent magnetic thruster field;
wherein
responsive to applying said first and second voltages having a combination of said first and second mutually opposing polarities, said first nonpermanent magnetic forcer and thruster fields are mutually attractive and urge said reciprocating shaft to move said first thruster coil toward said first forcer coil, and
responsive to applying said first and second voltages having a different combination of said first and second mutually opposing polarities, said first nonpermanent magnetic forcer and thruster fields are mutually repellant and urge said reciprocating shaft to move said first thruster coil away from said first forcer coil.

30. The method of claim 29, further comprising:
guiding at least a portion of said first nonpermanent magnetic forcer field with a ferrous housing enclosing at least said first forcer coil; and
guiding at least a portion of said first nonpermanent magnetic thruster field with an open ferrous container that is disposed coaxially with said shaft and circumferentially about said first thruster coil, and is open toward said first forcer coil.

31. The method of claim 30, further comprising causing, with said reciprocating shaft, a poppet valve for an internal combustion engine to open and close.

32. The method of claim 31, further comprising mechanically engaging said reciprocating shaft with a stem of said poppet valve.

33. The method of claim 29, further comprising:
guiding at least a portion of said first nonpermanent magnetic forcer field with a ferrous housing enclosing at least said first forcer coil;
applying, to a second forcer coil that is within said ferrous housing and disposed coaxially with and stationary relative to said reciprocating shaft, a third voltage having one of third mutually opposing polarities and inducing a second nonpermanent magnetic forcer field; and
guiding at least a portion of said second nonpermanent magnetic forcer field with said ferrous housing;
guiding at least a portion of said first nonpermanent magnetic thruster field with a ferrous sleeve disposed circumferentially about said first thruster coil;
wherein,
responsive to applying said third and second voltages having a combination of said third and second mutually opposing polarities, said second nonpermanent magnetic forcer field and said first nonpermanent magnetic thruster field are mutually attractive and urge said reciprocating shaft to move said first thruster coil toward said second forcer coil, and
responsive to applying said third and second voltages having a different combination of said third and second mutually opposing polarities, said second nonpermanent magnetic forcer field and said first nonpermanent magnetic thruster field are mutually repellant and urge said reciprocating shaft to move said first thruster coil away from said second forcer coil.

34. The method of claim 33, further comprising causing, with said reciprocating shaft, a poppet valve for an internal combustion engine to open and close.

35. The method of claim 34, further comprising mechanically engaging said reciprocating shaft with a stem of said poppet valve.

36. The method of claim 29, further comprising:
guiding at least a portion of said first nonpermanent magnetic forcer field with a ferrous housing enclosing at least said first forcer coil;
applying, to a second forcer coil that is within said ferrous housing and disposed coaxially with and stationary relative to said reciprocating shaft, a third voltage having one of third mutually opposing polarities and inducing a second nonpermanent magnetic forcer field;
guiding at least a portion of said second nonpermanent magnetic forcer field with said ferrous housing;
guiding at least a portion of said first nonpermanent magnetic thruster field with a first open ferrous container that is disposed coaxially with said shaft and circumferentially about said first thruster coil, and is open toward said first forcer coil;
applying, to a second thruster coil that is disposed coaxially with and affixed to said reciprocating shaft, a fourth voltage having one of fourth mutually opposing polarities and inducing a second nonpermanent magnetic thruster field; and
guiding at least a portion of said second nonpermanent magnetic thruster field with a second open ferrous container that is disposed coaxially with said shaft and circumferentially about said second thruster coil, and is open toward said second forcer coil;
wherein,
responsive to applying said third and second voltages having a combination of said third and second mutually opposing polarities, said second nonpermanent magnetic forcer field and said second nonpermanent magnetic thruster field are mutually attractive and urge said reciprocating shaft to move said second thruster coil toward said second forcer coil, and
responsive to applying said third and second voltages having a different combination of said third and second mutually opposing polarities, said second nonpermanent magnetic forcer field and said second nonpermanent magnetic thruster field are mutually repellant and urge said reciprocating shaft to move said second thruster coil away from said second forcer coil.

37. The method of claim 36, further comprising:
applying, to a third forcer coil that is within said ferrous housing and disposed coaxially with and stationary relative to said reciprocating shaft, a fifth voltage having one of fifth mutually opposing polarities and inducing a third nonpermanent magnetic forcer field;
guiding at least a portion of said third nonpermanent magnetic forcer field with said ferrous housing;

applying, to a third thruster coil that is disposed coaxially with and affixed to said reciprocating shaft, a sixth voltage having one of sixth mutually opposing polarities and inducing a third nonpermanent magnetic thruster field;

wherein, responsive to applying said fifth and sixth voltages having a combination of said fifth and sixth mutually opposing polarities, said third nonpermanent magnetic forcer field and said third nonpermanent magnetic thruster field are mutually attractive and urge said reciprocating shaft to move said third thruster coil toward said third forcer coil, and responsive to applying said fifth and sixth voltages having a different combination of said fifth and sixth mutually opposing polarities, said third nonpermanent magnetic forcer field and said third nonpermanent magnetic thruster field are mutually repellant and urge said reciprocating shaft to move said third thruster coil away from said third forcer coil.

* * * * *

UNITED STATES PATENT AND TRADEMARK OFFICE
CERTIFICATE OF CORRECTION

PATENT NO. : 10,774,696 B2
APPLICATION NO. : 15/947131
DATED : September 15, 2020
INVENTOR(S) : Richard H. Hutchins et al.

It is certified that error appears in the above-identified patent and that said Letters Patent is hereby corrected as shown below:

On the Title Page

Item (12) should read:
Hutchins et al.

Item (72), the listing of inventors should be as follows:
-- Richard H. Hutchins, South San Francisco, CA (US); Dallas Perkins, Ponder, TX (US); Hesan Vahedi, Escondido, CA (US); David Gonsoulin, San Diego, CA (US); Christopher Edrington, Anderson, SC (US) --

Signed and Sealed this
Second Day of April, 2024

Katherine Kelly Vidal
*Director of the United States Patent and Trademark Office*